(12) United States Patent
Keshavan

(10) Patent No.: US 7,451,838 B2
(45) Date of Patent: Nov. 18, 2008

(54) HIGH ENERGY CUTTING ELEMENTS AND BITS INCORPORATING THE SAME

(75) Inventor: Madapusi K. Keshavan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 79 days.

(21) Appl. No.: 11/449,523

(22) Filed: Jun. 7, 2006

(65) Prior Publication Data

US 2007/0029116 A1 Feb. 8, 2007

Related U.S. Application Data

(60) Provisional application No. 60/705,518, filed on Aug. 3, 2005.

(51) Int. Cl.
*E21B 10/36* (2006.01)
(52) U.S. Cl. .................................. 175/374; 175/426
(58) Field of Classification Search ................ 175/374, 175/426, 432, 434
See application file for complete search history.

(56) References Cited

U.S. PATENT DOCUMENTS

| | | | |
|---|---|---|---|
| 4,389,465 A | 6/1983 | Nakai et al. | |
| 4,403,015 A | 9/1983 | Nakai et al. | |
| 4,515,011 A * | 5/1985 | Beimgraben | 73/152.48 |
| 4,679,971 A | 7/1987 | Maier | |
| 5,443,337 A | 8/1995 | Katayama | |
| 5,505,272 A | 4/1996 | Clark | |
| 5,510,193 A | 4/1996 | Cerutti et al. | |
| 5,569,862 A | 10/1996 | Kuroyama et al. | |
| 5,580,196 A | 12/1996 | Thompson | |
| 5,603,070 A * | 2/1997 | Cerutti et al. | 419/6 |
| 5,611,251 A | 3/1997 | Katayama | |
| 5,639,285 A | 6/1997 | Yao et al. | |
| 5,685,671 A | 11/1997 | Packer et al. | |
| 5,697,994 A | 12/1997 | Packer et al. | |
| 5,830,813 A | 11/1998 | Yao et al. | |
| 5,833,020 A | 11/1998 | Portwood et al. | |
| 5,868,885 A | 2/1999 | Crockett et al. | |
| 5,887,668 A | 3/1999 | Haugen et al. | |
| 5,915,486 A | 6/1999 | Portwood et al. | |
| 5,967,245 A | 10/1999 | Garcia et al. | |
| 6,029,544 A | 2/2000 | Katayama | |
| 6,063,502 A | 5/2000 | Sue et al. | |
| 6,068,913 A | 5/2000 | Cho et al. | |

(Continued)

FOREIGN PATENT DOCUMENTS

EP 0 272 913 3/1993

(Continued)

OTHER PUBLICATIONS

International Search Report for Application No. GB0612464.8 dated Sep. 14, 2006.

(Continued)

*Primary Examiner*—William P Neuder
(74) *Attorney, Agent, or Firm*—Christie, Parker & Hale, LLP

(57) ABSTRACT

High energy sheer cutting elements and bits incorporating the same are provided. The cutting elements have at least a portion of their cutting layers which will be exposed to high temperatures during drilling formed from a PCBN material capable of operating at temperatures of at least 1000° C.

19 Claims, 3 Drawing Sheets

U.S. PATENT DOCUMENTS

| | | |
|---|---|---|
| 6,090,476 A | 7/2000 | Thysell et al. |
| 6,132,148 A | 10/2000 | Thompson |
| 6,140,262 A | 10/2000 | Collier et al. |
| 6,152,657 A | 11/2000 | Packer et al. |
| 6,158,304 A | 12/2000 | Packer et al. |
| 6,193,001 B1 | 2/2001 | Eyre et al. |
| 6,290,008 B1 | 9/2001 | Portwood et al. |
| 6,331,497 B1 | 12/2001 | Collier et al. |
| 6,361,873 B1 | 3/2002 | Yong et al. |
| 6,451,442 B1 | 9/2002 | Sue et al. |
| 6,579,045 B1 | 6/2003 | Fries et al. |
| 6,599,062 B1 | 7/2003 | Oles et al. |
| 6,607,835 B2 | 8/2003 | Fang et al. |
| 6,640,913 B2 | 11/2003 | Lockstedt et al. |
| 6,676,893 B2 | 1/2004 | Rolander et al. |
| 6,696,137 B2 | 2/2004 | Yong |
| 6,737,178 B2 | 5/2004 | Ota et al. |
| 6,841,260 B2 | 1/2005 | Sue et al. |
| 6,848,521 B2 | 2/2005 | Lockstedt et al. |
| 6,861,098 B2 | 3/2005 | Griffin et al. |
| 2002/0194955 A1 | 12/2002 | Fang et al. |
| 2003/0162648 A1 | 8/2003 | Middlemiss |
| 2004/0016557 A1 | 1/2004 | Keshavan et al. |
| 2004/0045743 A1 | 3/2004 | Lockstedt et al. |
| 2004/0140132 A1 | 7/2004 | Middlemiss |
| 2004/0141865 A1 | 7/2004 | Keshavan et al. |
| 2004/0245022 A1 | 12/2004 | Izaguirre et al. |
| 2005/0050801 A1 | 3/2005 | Cho et al. |
| 2006/0162969 A1* | 7/2006 | Belnap et al. ............... 175/433 |
| 2006/0207802 A1* | 9/2006 | Zhang et al. ............... 175/374 |
| 2006/0249308 A1* | 11/2006 | Tank ........................... 175/57 |
| 2006/0260846 A1* | 11/2006 | Portwood et al. ........... 175/331 |

OTHER PUBLICATIONS

Bailey, M.W., et al., "The increasing importance of PCD/diamond/CVDD and PCBN/cBN tooling in the automotive industry"—Metalworking, *Industrial Diamond Review*; Jan. 2002; pp. 53-60; published by the Industrial Diamond Association of America.

Halpin, et al.; "The performance of PCBN in hard turning"—PCBN tooling, *Industrial Diamond Review*; Apr. 2005; pp. 52-60.

* cited by examiner

HIGH ENERGY CUTTING ELEMENTS AND BITS INCORPORATING THE SAME

CROSS-REFERENCE TO RELATED APPLICATION

This application claims priority and is based upon U.S. Provisional Application No. 60/705,518 filed on Aug. 3, 2005, the contents of which are fully incorporated herein by reference.

BACKGROUND OF THE INVENTION

This invention relates to cutting elements and more specifically to high energy shear cutting elements having a cutting layer comprising polycrystalline cubic boron nitride (PCBN) and to bits incorporating the same and more specifically to turbine driven bits incorporating the same.

Shear cutting elements used in earth-boring bits have a tungsten carbide substrate body over which is bonded a polycrystalline diamond ("PCD") material cutting layer which is used to do the cutting. PCD materials, however, have many limitations. For example, the thermal stability of PCD deteriorates due to graphitization at temperatures above 650° C. This is typically caused by the air and the presence of cobalt around the diamond crystals. Similarly, cracking tends to develop at temperatures above 650° C. due to thermal mismatch between the diamond crystals and cobalt forming the PCD material layer.

In an effort to get PCD to operate at higher temperatures, the catalyst found in PCD material is sometimes fully leached so as to enhance the thermal stability of the PCD material. In such case, the PCD can withstand temperatures up to 1000° C. in air. However, graphitization of the PCD does increase with temperatures above 1000° C. Consequently, shear cutting elements having a PCD cutting layer cannot be used to cut earth formation when the cutting layer temperature will exceed 650° C. or 1000° C., depending on whether the PCD layer is leached.

Cutting layer temperatures of cutting elements on bits driven by high speed turbines or motors (hereinafter "turbine bits") exceed 1000° C. These bits are operated at greater than 300 RPM, to cut formations having a strength greater than 10,000 psi. Turbines driving turbine bits typically operate at RPM levels of 1,000 RPM or greater and the turbine bits rotate at levels of about 300 RPM or greater.

PCBN has been disclosed for use in cutting elements for drilling of formations. However, to date no PCBN materials is used as a cutting layer in earth-boring conditions due to its relatively poor strength and toughness when compared to PCD.

SUMMARY OF THE INVENTION

Cutting elements for drilling earth formations at high temperature and high speeds as well as bits incorporating such cutting elements are provided. In one exemplary embodiment, a bit for drilling earth formations is provided having a shear cutting element mounted thereon. The shear cutting element includes a substrate and a cutting layer over the substrate. The cutting layer includes a PCBN portion for contacting a formation during drilling. The bit is operable at rotational speeds exposing the PCBN portion to temperatures of at least 1000° C. In one exemplary embodiment, the entire cutting layer is made of PCBN. The PCBN in an exemplary embodiment has a strength of 100 ksi and in another exemplary embodiment has a strength in the range of 100 to 200 ksi. In a further exemplary embodiment, another ultra hard material is provided adjacent to the PCBN portion. The ultra hard material in one exemplary embodiment is PCD. The ultra hard material may form a layer interposed between the PCBN portion and the substrate. The PCD layer may be partly of wholly leached. In another exemplary embodiment, the PCBN material may be a single layer of material or may be formed from multiple layers of PCBN material having the same or different characteristics.

In yet a further exemplary embodiment where PCD is used along with PCBN to form the cutting element cutting layer, the PCBN protects the PCD from high temperatures. For example in cases where the PCD is not leached, the PCBN material ensures that the operating temperature of the PCD is maintained at or below 650° C. In cases where the PCD is fully leached, the operating temperature of the PCD is maintained at or below 1000° C. In another exemplary embodiment, the PCBN has a thermal gradient ranging from about 200 to 2000° C./mm.

In one exemplary embodiment, the bit is driven by a turbine operating at least at 1000 RPM. In another exemplary embodiment, the bit rotates at a rotational speed of at least 300 RPM and in a further exemplary embodiment the bit rotates in the range of 400 to 1400 RPM. In yet a further exemplary embodiment, during drilling the weight on the bit is in the range of 10,000 lbs. to 45,000 lbs. In another exemplary embodiment, during drilling the weight on the bit is in the range of 15,000 lbs. to 45,000 lbs. In yet another exemplary embodiment, during drilling the weight on the bit is in the range of 10,000 lbs. to 15,000 lbs. The bit may be any type of bit incorporating shear cutting elements, as for example a drag bit or a roller cone bit.

DETAILED DESCRIPTION OF EXEMPLARY EMBODIMENTS OF THE INVENTION

In an exemplary embodiment, shear cutting elements are provided which include a cutting layer including polycrystalline cubic boron nitride ("PCBN") for use with turbine bits for drilling earth formations with a shearing action where the temperature at the cutting layer of the cutting element exceeds 1000° C. during drilling. In other exemplary embodiments, turbine driven bits incorporating such cutting elements are provided.

Although PCBN materials have not been suitable for use with cutting elements mounted on earth boring bits, applicant believes that PCBN is a suitable material for a cutting layer in a shear cutting element used in a turbine bit. PCBN provides for thermal stability at high temperature and is able to withstand the loads provided during drilling with turbine bits. Applicant has discovered that turbine bits, although operating at higher RPMs, tend to have lower vibrations and impact loads. Consequently, applicant believes that the PCBN material will withstand the operating environment during drilling. Thus, applicant believes that PCBN is a suitable material for use in a cutting layer of shear cutting element on a turbine bit.

The exemplary shear cutting elements for use with turbine bits include PCBN in their cutting layer for making contact with the earth formations during drilling. The PCBN material is capable of operating at temperatures is excess of about 1000° C. These cutting elements are high-energy cutting elements in that they may be used with turbine bits for high speed high temperature drilling. Turbines drive the turbine bits at RPMs at greater than 300 RPM. Some turbine bits operate in the range of 400 to 1400 RPM. Turbine bits may be used to cut formations having strength of greater than 10,000 psi.

Figure 1:
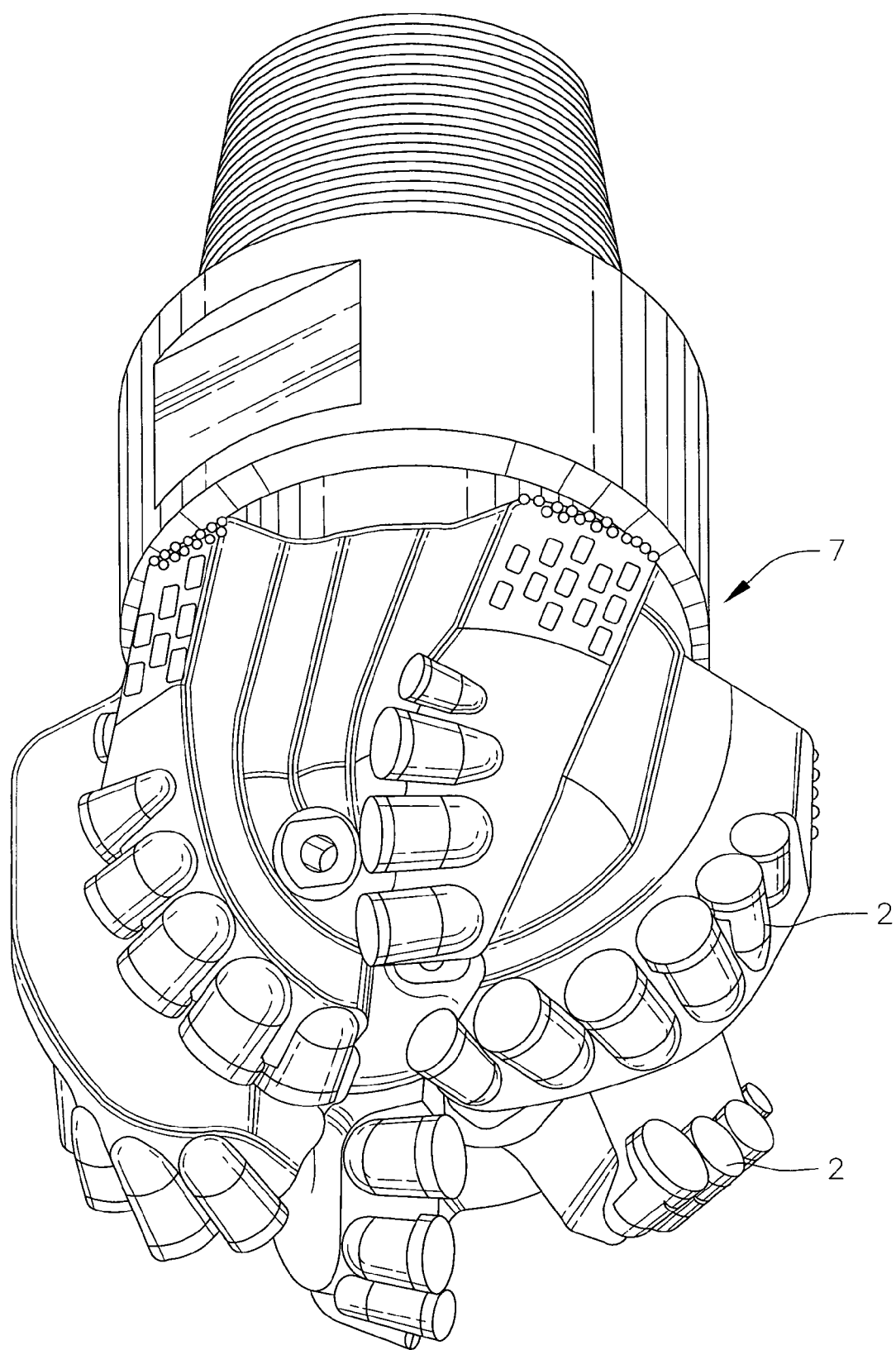
FIG. 1 is a perspective view of a drag bit incorporating exemplary cutting elements of the present invention.
Figure 2:
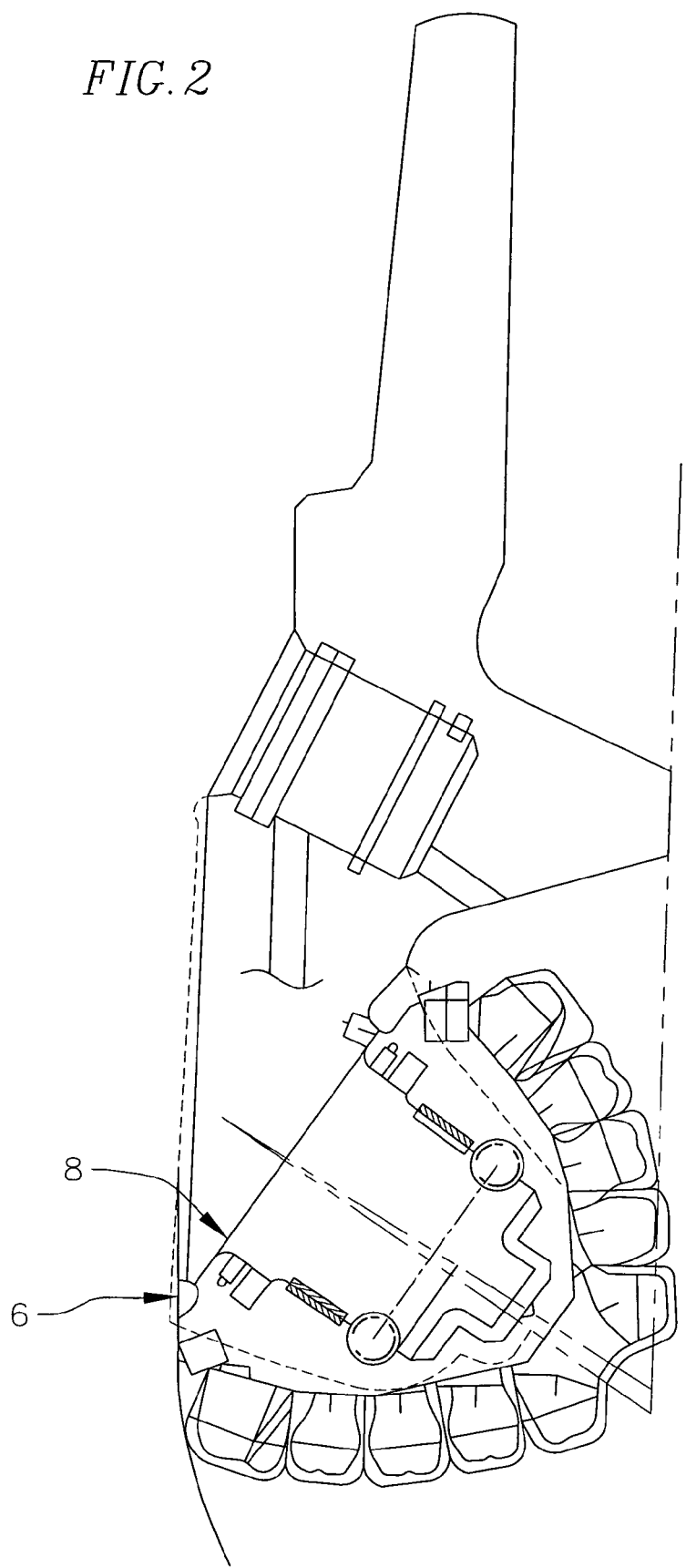
FIG. 2 is a partial cut out view of a rotary cone bit incorporating exemplary cutting elements of the present invention.

The exemplary high-energy cutting elements may be used on many types of bits where the cutting elements cut via a shearing action. For example, these cutting elements may be used as cutting elements 2 in a drag bit 4 or may be used as gage cutters 6 in a rotary cone bit 8, as for example shown in FIGS. 1 and 2, respectively.

The exemplary cutting elements are formed using known sintering methods whereby CBN powder is sintered onto a substrate such as a tungsten carbide substrate forming a PCBN layer bonded to the substrate. The substrate may form the body of the cutting element. In other exemplary embodiments, the substrate with bonded PCBN form a compact which may then be bonded to a body of the cutting element. In other exemplary embodiments, the PCBN cutting layer may be formed separately and then bonded to the body of the cutting element.

Exemplary PCBN materials that may be used to form the cutting layers of these high-energy cutting elements may be PCBN materials having a strength greater than 100 ksi and is an exemplary embodiment greater than 100 to 200 ksi. Such PCBN materials are known in the art. An exemplary PCBN material may formed by coarse grain cubic boron nitride ("CBN") crystals mixed with about 10% to about 20% fine CBN crystals in the range of 0-2 microns, which are synthesized with a catalyst material such as Al, Al—Si, TiCN, cobalt aluminide or mixtures thereof during the sintering process. Exemplary coarse grain CBN crystals have a size in the range of 2-10 microns. In another exemplary embodiment, the PCBN material has CBN having an average grain size in the range of 10-20 microns and has a density greater than 93%. In another exemplary embodiment, the PCBN material has an average grain size less than 5 microns.

Other PCBN materials that are suitable, include PCBN materials which have been developed for turning applications of ferrous and non-ferrous materials where the working material temperatures exceed 1000° C. and in many instances exceed 1100° C. Exemplary materials include materials used in the finish turning of steel and other high temperature metals such Stellite, Inconel etc. Other PCBN materials may also be used which have been developed for use in high-speed applications where heat is an issue. In one exemplary embodiment, such materials include in the range of 45% to 80% CBN by volume. Further exemplary embodiment PCBN materials that may be used are described in U.S. Pat. No. 6,331,497, the contents of which are fully incorporated herein by reference. Other exemplary PCBN materials may include CBN having a crystal size in the range of from about 10 to 17 microns and including in the range of from 2 to 15% by weight of a material selected from the group of refractory compounds consisting of titanium diboride, aluminum diboride, titanium carbide, titanium nitride, titanium carbonitride, and titanium aluminum carbonitride. The carbonitride system encompasses a range of compositions from titanium nitride to titanium carbide. Preferably, the carbonitride has a carbon to nitrogen proportion in the range of from 20 atomic percent carbon and 70 atomic percent nitrogen to 70 atomic percent carbon and 30 atomic percent nitrogen. The mixture of CBN and refractory compound is infiltrated with aluminum and/or silicon, preferably a eutectic composition of silicon and aluminum.

Figure 3:
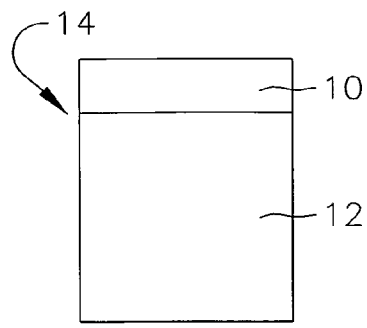
FIGS. 3-9 are cross-sectional views of exemplary embodiment cutting elements of the present invention.

In one exemplary embodiment, a PCBN layer 10 is bonded to a substrate 12 forming a cutting element 14, as for example shown in FIG. 3. In this exemplary embodiment, the PCBN layer 10 makes up the entire cutting layer.

Figure 4:
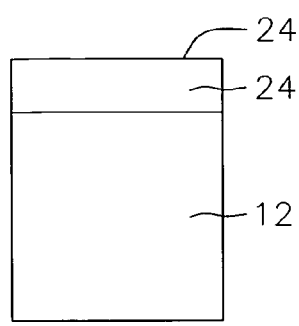
Figure 5:
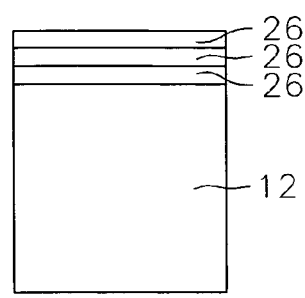

In another exemplary embodiment, the PCBN cutting layer is engineered to have a thermal gradient in the range of 200° to 2000° C./mm. In other words, the cutting layer is designed such that the temperature drops from about 200° C. to 2000° C. per millimeter away from the working surface 24 as for example shown in FIG. 4. Exemplary cutting layers may contain greater than 90% by weight PCBN or may be formed from mixtures of PCBN and other ceramic materials. In alternate exemplary embodiments, any of the aforementioned PCBN cutting layers may be formed from two or more PCBN layers 26 each having the same or different thermal gradients, and/or the same or different thicknesses as for example, shown in FIG. 5.

Figure 6:
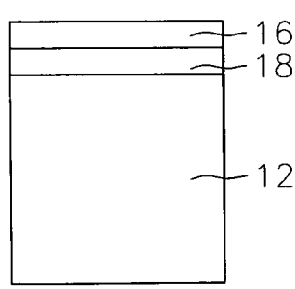
Figure 7:
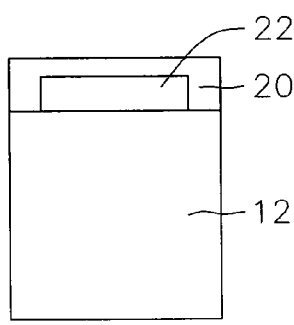

In another exemplary embodiment, the cutting layer may be a composite of PCD and PCBN. In this regard, the cutting layer may be engineered to have better strength and toughness when compared to a PCBN material by itself. For example a PCBN layer 16 may be bonded to a PCD 18 layer as for example shown in FIG. 6. In an alternate exemplary embodiment, a PCBN layer 20 may cover the entire PCD layer 22, as for example shown in FIG. 7 where the PCBN layer encapsulates the PCD layer. The composite cutting layer incorporating a PCD material as well as a PCBN material may be formed in accordance with the principles described in U.S. Pat. Nos. 4,403,015; 5,510,193; and 5,603,070, the contents of which are fully incorporated herein by reference.

With these exemplary embodiment cutting elements, the PCBN outer layer serves to protect the PCD material from the operating temperatures in excess of 1000° C. In an exemplary embodiment, by using a PCBN material over the PCD material which has a thermal gradient in the range of about 200° to about 2000° C., the temperature to which the PCD material is exposed to can be controlled by controlling the thickness and/or the thermal gradient of the PCBN layer. In an exemplary embodiment, the PCBN layer serves to keep the temperature of the PCD material below 650° C., or below 1000° C. if the PCD material is leached. In this regard, the PCD material is not subject to graphitization due to high temperature exposure.

Figure 8:
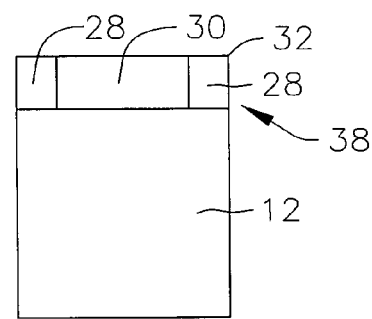
Figure 9:
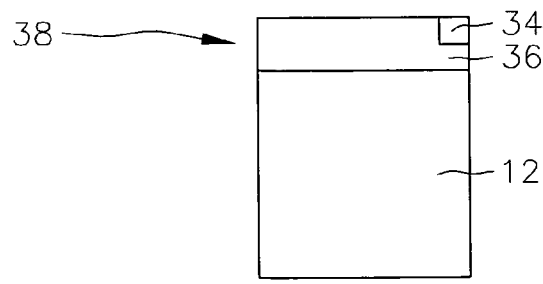

In another embodiment, any of the aforementioned PCBN materials may be used to form a cutting layer having a layer 28 surrounding another ultra hard material layer 30, such as a PCD ultra hard material layer 30, as for example shown in FIG. 8. In this regard the cutting edge 32 that will be exposed to the highest temperatures during drilling is made of PCBN. The PCBN material may extend around the entire periphery of the cutting element, as for example shown in FIG. 8. In other exemplary embodiments, the PCBN material may form only the portion of the cutting layer defining an edge 34 that will make contact with the earth formation during drilling, as for example shown in FIG. 9. The remaining portion 36 of the cutting layer may be made from another material such as another PCBN material or another PCD material, as for example shown in FIG. 9. The PCBN portion to make contact with the earth formations may extend along the entire thickness of the cutting layer 38 as shown in FIG. 8 or may extend along a portion of the thickness of the cutting layer 38 as shown in FIG. 9. Again, the PCBN material serves to protect the other ultra hard material in the cutting layer from the high operational temperatures.

Thus, as can be seen, with the present invention, the cutting elements may be engineered for the task at hand by providing the appropriate PCBN materials proximate the cutting edge of the cutting element which is subjected to high temperatures, as for example, temperatures in excess of 1000° C. during drilling. For example by using a combination of PCBN with PCD to form the cutting layer of the exemplary cutting elements an engineered cutting layer material is formed that is capable of withstanding the high operating temperatures and have sufficient strength and toughness for the drilling at task.

Applicant believes that the exemplary embodiment cutting elements mounted on turbine-driven bits would be able to operate in cutting environments where the weight on the bit will be at least 10,000 lbs. and in one exemplary embodiment, will be in the range of 10,000 lbs. to 45,000 lbs. In another exemplary embodiment, the weight on the bit will be in the range of 10,000 lbs. to 15,000 lbs. In a further exemplary embodiment, the weight on the bit will be in the range of 15,000 lbs. to 45,000 lbs.

It should be noted that the term "substrate" as used herein means any body onto which an exemplary cutting layer is bonded to. For example a substrate may be the body of a cutting element or a transition layer bonded to the body of a cutting element.

Although the present invention has been described and illustrated to respect to exemplary embodiments, it is to be understood that it is not to be so limited, since changes and modifications may be made therein which are within the full intended scope of this invention as hereinafter claimed.

What is claimed is:

1. A bit for drilling earth formations, said bit having a shear cutting element mounted thereon, the shear cutting element comprising:
   a substrate;
   a cutting layer over the substrate comprising a PCBN portion for contacting a formation during drilling, wherein said PCBN portion has a thermal gradient ranging from about 200 to 2000° C./mm.

2. A bit as recited in claim 1 wherein said entire cutting layer is a PCBN cutting layer.

3. A bit as recited in claim 1 wherein the cutting layer further comprises another portion comprising an ultra hard material adjacent to the PCBN portion.

4. A bit as recited in claim 3 wherein the ultra hard material is PCD.

5. A bit as recited in claim 2 wherein the cutting element further comprises a PCD layer interposed between the PCBN layer and the substrate.

6. A bit as recited in claim 5 wherein the PCD layer is completely encapsulated by the PCBN layer and the substrate.

7. A bit as recited in claim 1 wherein said bit is driven by a turbine and is operable at least at 1000 RPM.

8. A bit as recited in claim 1 wherein the bit is operable at a rotational speed of at least 300 RPM.

9. A bit as recited in claim 1 wherein the bit is operable at a rotational speed in the range of 400 to 1400 RPM.

10. A bit as recited in claim 1 wherein said bit is operable with a weight in the range of 10,000 lbs. to 45,000 lbs. acting on said bit.

11. A bit as recited in claim 1 wherein said bit is operable with a weight in the range of 10,000 lbs. to 15,000 lbs. acting on said bit.

12. A bit as recited in claim 1 wherein said bit is operable with a weight in the range of 15,000 lbs. to 45,000 lbs. acting on said bit.

13. A bit as recited in claim 1 wherein the bit is a turbine drag bit.

14. A bit as recited in claim 1 wherein the bit is a turbine rotary cone bit.

15. A bit as recited in claim 1 wherein said cutting layer comprises a plurality of PCBN portions.

16. A bit as recited in claim 1 wherein said cutting layer is formed from a plurality of PCBN layers bonded together.

17. A bit as recited in claim 16 wherein said PCBN portion is part of one of said plurality of layers.

18. A bit as recited in claim 1 wherein the PCBN portion has a strength of at least 100 ksi.

19. A bit as recited in claim 1 wherein the PCBN portion has a strength of 200 ksi.

* * * * *